(No Model.) 2 Sheets—Sheet 1.
A. H. EMERY.
PRESSURE GAGE.
No. 278,907. Patented June 5, 1883.
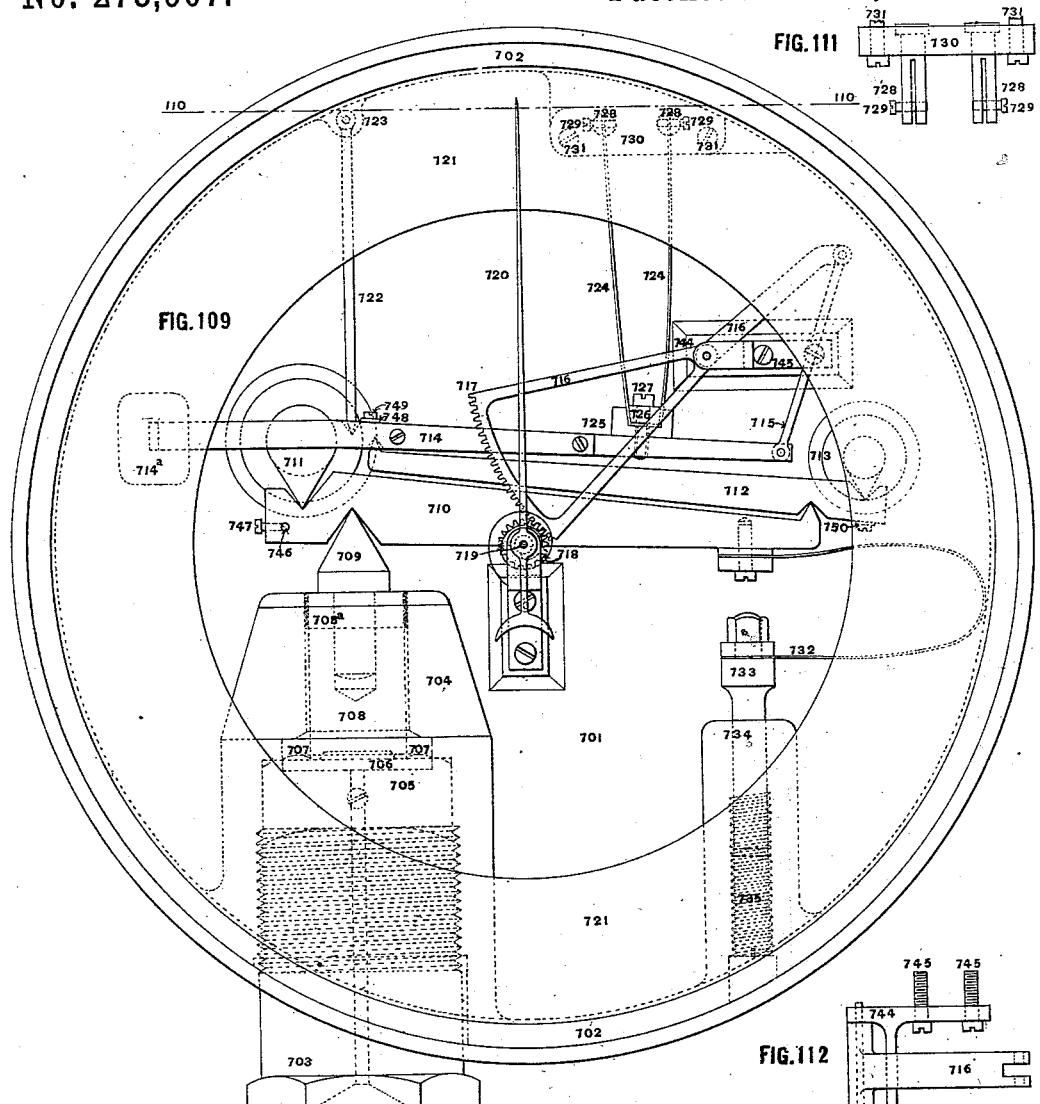
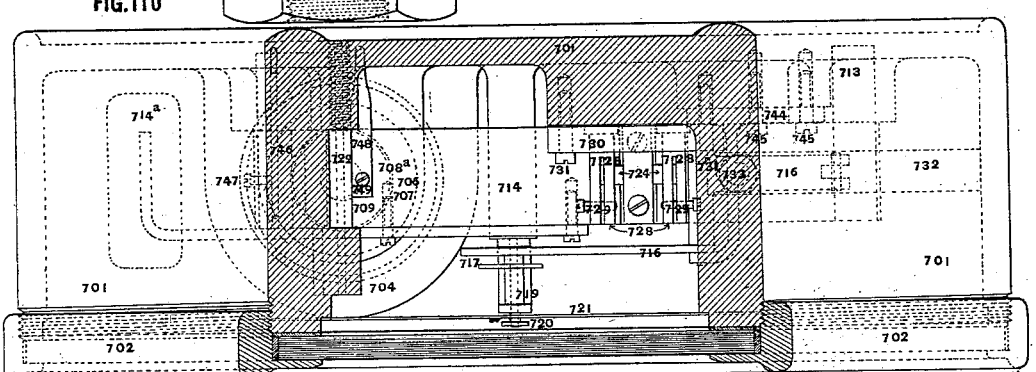
WITNESSES: Walter Allen, Harry C. Knight
INVENTOR: Albert H. Emery
By Knight Bros. Attys

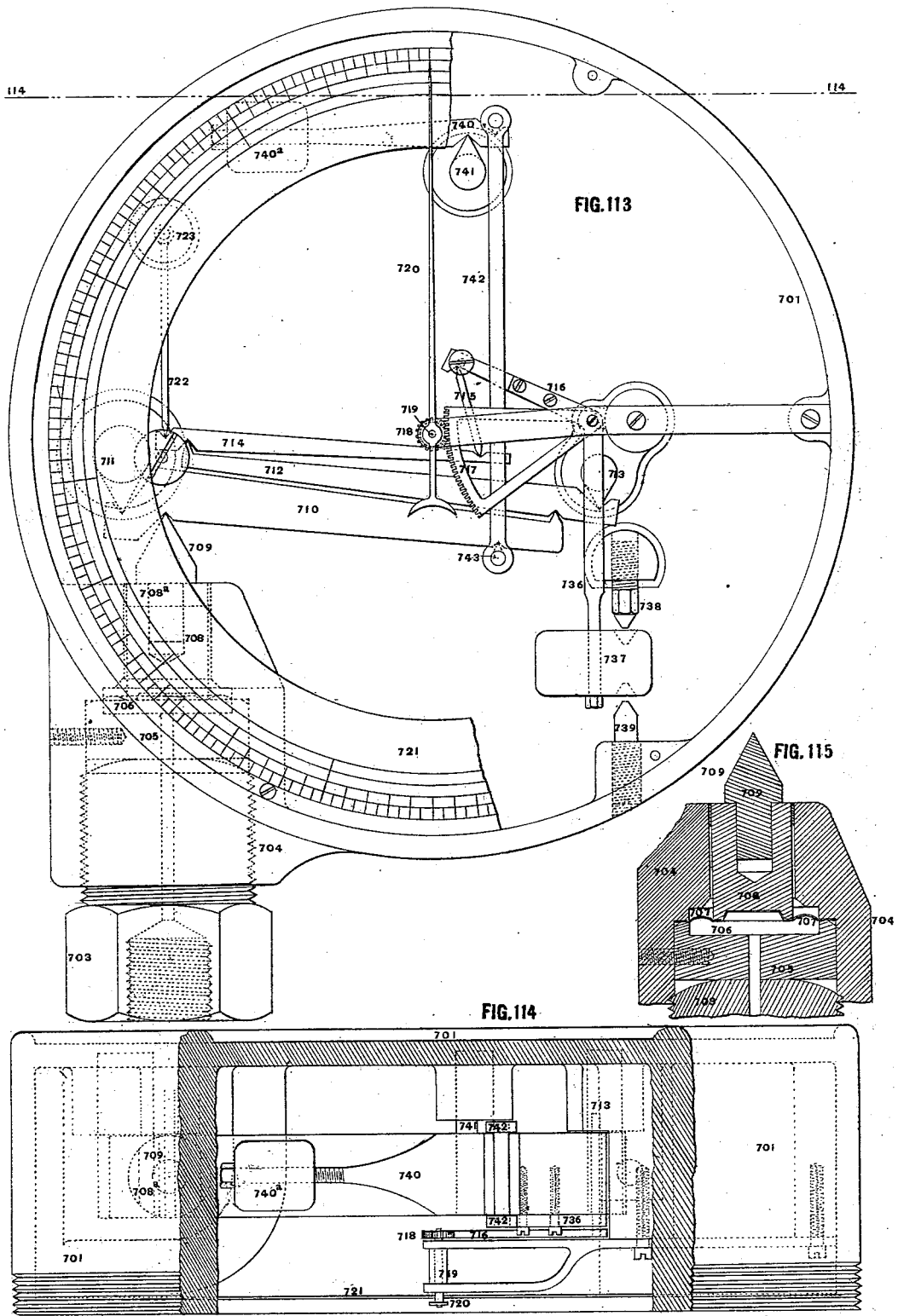

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

PRESSURE-GAGE.

SPECIFICATION forming part of Letters Patent No. 278,907, dated June 5, 1883.

Application filed February 5, 1881. (No model.)

*To all whom it may concern:*

Be it known that I, ALBERT H. EMERY, of the city, county, and State of New York, have invented certain new and useful Improvements in Pressure-Gages, of which the following is a specification.

The improved gage is made with a casing of cylindrical or other convenient form. The pressure is received through a liquid confined within a chamber, the top of which is formed by a flexible diaphragm, on which rests a column to transmit the pressure to the indicating mechanism, which is such that the movement of the diaphragm is exceedingly small as compared with those heretofore in use. The diaphragm is clamped at its outer edge by a sealing-plug held to its seat by a screw-plug which has a convex face to cause it to bear on the central portion of the sealing-plug, and thus produce an equal pressure around the margin of the diaphragm. The pressure-column is surmounted by a head formed with a knife-edge, which transmits the pressure to the load-levers. One or more of said levers are fulcrumed on knife-edges formed on studs fixed within the case. The final transmitting-lever has a movable fulcrum on the end of a pivoted strut. The pressure is received endwise on a pair of springs which are clamped by their extremities to the last lever, and are slightly bowed. Elastic studs or plates attached to the case and to each lever near its fulcrum preserve them from lateral movement or displacement.

This invention is represented in the accompanying drawings by seven figures, numbered 109 to 115, inclusive. Figure 109 is a front elevation of a gage illustrating the invention. Fig. 110 is a horizontal section on the line 110, Fig. 109. Fig. 111 is a plan view of a pair of studs used for the attachment of the resisting-springs, hereinafter described. Fig. 112 is a plan view of a lever by which rotary motion is imparted to the indicator. Fig. 113 is a front elevation illustrating a modification of the invention. Fig. 114 is a horizontal section on the line 114, Fig. 113. Fig. 115 is a central vertical section of the pressure-chamber.

701 represents a cylindrical case with a glazed front, 702, which may be screwed to the case, as shown, or attached by hinges or other means. 703 is a coupling for connecting the gage to any object containing liquid under pressure. The coupling 703 is screwed into a neck, 704, on the gage-case, and is formed with a convex end bearing upward against a sealing-plug, 705, through which is an opening to admit the fluid under pressure to the chamber 706. The top of the chamber 706 is formed by a flexible metallic diaphragm, 707, the outer edge of which is clamped between the sealing-plug 705 and the neck 704 of the gage-case. On the diaphragm 707 rests a column, 708, provided with a removable head, 709, formed with a knife-edge bearing against a lever, 710, which has its fulcrum on a knife-edged stud, 711, which is fixed securely in the case 701 by being driven firmly to its seat therein. The pressure-column 708 is surrounded by an elastic centering-ring, $708^a$, of rubber or other suitable material. The free end of the lever 710 bears against a secondary lever, 712, fulcrumed on a knife-edged stud, 713, and bearing upward against another lever, 714, by which motion is communicated through a bar or link, 715, to a lever-frame, 716, constructed at its free end with a segmental rack, 717, which gears with a pinion, 718, on the shaft 719 of the indicator 720. The indicator works over a dial, 721, on the face 702 of the casing. The lever-frame 716 is fulcrumed in a bracket, 744, fastened to the back of the case by screws 745. This lever-frame and its supporting-bracket are shown in plan in Fig. 112. The fulcrum of the lever 714 is formed by a strut, 722, hinged at 723 to the casing. The hinged strut 722 and the bar or link 715, forming the end connections of the lever 714, permit a slight horizontal movement of the said lever, to enable it to follow the arc described by the extremity of the lever 712, which bears upon it. The secondary lever 712 may have a similar swinging fulcrum, and should have if but two levers be employed, when its movement is very great. The operating mechanism of the indicator may be directly connected to the second lever. The resistance to the pressure is received by a pair of springs, 724, clamped at their extremities within a box, 725, by means of a plug, 726, and screw 727, which connect the ends of the springs to the lever 714. These springs are attached to the case by means of clampingplugs 728, which are clamped by screws 729, and are held by a plate, 730, fastened to the back of the case by screws 731. The flanged butts of the clamping-studs 728 will be seen to project slightly beyond the rear surface of their holding-block 730, so that by means of the screws 731 any necessary pressure may be brought upon the said studs to hold them in the position to which they are adjusted. They are turned to impart a slight bow to the springs, and hold the springs in this position, as represented in Fig. 109, adapting the said springs to yield with sufficient freedom to the upward pressure of the lever 714 and to offer an increased resistance thereto. In order to hold the bearings in close contact when there is little or no pressure on the column 708, a load-spring, 732, is employed, clamped by one end to the lever 710, and by the other end to a stud, 733, occupying a socket, 734, in the case, and forced up by a screw, 735, within said socket, so as to exert the required pressure upon the lever. This spring 732 may, if preferred, be fixed directly to the casing. The spring 732 will be seen to resist the initial pressure of the main resisting-spring 724. Springs may be applied to either of the levers, as preferred. Instead of the springs 724, a swinging arm, 736, carrying a weight, 737, may be employed, as illustrated in Fig. 113. The arm 736 projects rigidly from the lever-frame 716, at or near its fulcrum, and hangs vertically when the parts are at rest and the indicator at zero; but when the pressure is exerted upon the levers the weighted arm 736 737 will be elevated, and the more it is deflected from a vertical position the more leverage and consequent resistance the weight will exert.

738 739 are a pair of screw-plugs employed to fix the weight 737 and its arm so as to hold all the parts rigidly in position for transportation. Instead of the springs 732, for holding the bearings in close contact, a lever-arm, 740, may be employed, carrying a weight, 740ª, as shown in Figs. 113 and 114. The said lever is fulcrumed on a knife-edged stud, 741, and connected by a pair of links, 742, with a crossbar, 743, which bears with a knife-edge under the lever 710, as shown. The weighted levers 736 and 740 are not specifically claimed as new, but are shown to illustrate the use of some of the novel parts of the invention in connection with this simple gravity contrivance in gages, the vertical and stationary position of which renders such gravitating device applicable. To fix the operating-levers against lateral motion, while permitting their vertical motion and such longitudinal motion as may be necessary, fixing-springs are employed, consisting of elastic rods or plates, each secured at one end to the back of the case, and at the other end to one of the levers near its fulcrum or center of motion.

746 represents one of these springs in the form of a rod screwed into the back of the case, as represented in dotted lines in Fig. 110, and fixed to the lever 710 by a set-screw, 747. 748 represents another of them in the form of a plate screwed, as before, into the back of the case and fixed to the lever 714 by a screw, 749. A similar plate is screwed into the back of the case and fixed to the lever 712 at 750 by a screw. (Shown in dotted lines in Fig. 109.) A weight, 714ª, is applied to the projecting heel or rear end of the lever 714, to counteract the gravity or inertia of the parts, as may be found needful to adapt the gage to work with proper effect. The result is to bring the center of gravity of the lever into coincidence with the fixed fulcrum, and hence any sudden movement or shock of the gage—such as may occur, for example, when it is used on locomotives—will affect equally all parts of the lever and prevent inertia from operating excessively on the long arm and disturbing the action of the lever, and consequently of the indicator.

A convex bearing between the screw-plug 703 and the sealing-plug 705 causes the latter to bear on the former at its center, so as to produce an equal pressure all around the periphery of the diaphragm 707. It will be manifest that it is immaterial to this device whether the convexity be on the extremity of the screw-plug 703, as shown in Fig. 115, or on the back of the sealing-plug 705, or both; or a similar effect is produced by making the face of one concave and the other convex, if the concavity be of larger radius than the convexity, or so shallow as to bear at the center, as stated.

It will be seen from the foregoing that I provide a gage in which there is but very slight movement of a flexible diaphragm, which movement is communicated without interposed resistance directly to one of a series of levers, and finally to an indicator, so that this exceedingly minute movement is sufficient to completely rotate the indicator. The resistance to the movement of the diaphragm I apply remotely from it, as set forth, so that the amount of resistance necessary may be very slight. The result is that I can employ a steel or other suitable metallic diaphragm and get sufficient movement, instead of being obliged to employ rubber or other variable and perishable substance, as has been necessary in gages heretofore made, where more extended movement of the diaphragm has been required.

Any novel subject-matter which I have described and not claimed or attempted to claim herein I have claimed or attempted to claim in other applications or have reserved to be claimed in future original applications.

The following is here claimed as new:

1. The combination of the case 701, coupling-plug 703, sealing-plug 705, diaphragm 707, and pressure-column 708.

2. The combination of the pressure-column 708, knife-edged head 709, and load-lever 710 with the gage-case 701 and metallic diaphragm 707, as and for the purposes set forth.

3. The combination, with the gage-case 701 and load-lever 710, of the fulcrum-piece 711, constructed and applied substantially as and for the purposes set forth.

4. The combination of the main load-lever 710, secondary lever 712, with suitable fulcrums, the pressure-column 708 709, and the gage-case 701, substantially as set forth.

5. An initial lifting or loading device, in combination with the load-lever 710, operating with the pressure-column, substantially as set forth.

6. The adjusting-screw 735, in combination with the spring 732, for varying its pressure, as set forth.

7. The fixing-springs 746 748, to secure the levers against lateral motion, as explained, in combination with the gage-case 701.

8. In a pressure-gage constructed and operating substantially as herein set forth, the weight 714$^a$, for counteracting the inertia and gravity of the parts, as explained.

9. The combination, with the gage-case 701 and lever 714, of the strut 722, constituting a swinging fulcrum, as and for the purposes set forth.

10. The resisting-springs 724, one or more, operating in combination with a load-lever and gage-case, substantially as and for the purposes set forth.

11. The combination of the clamping device 725 726 727 with the springs 724 and lever 714, substantially as and for the purposes set forth.

12. The adjusting holding-studs 728, in combination with the springs 724, for varying their flexure and resistance, as set forth.

13. In a pressure-gage, the combination of a pressure-column with a lever or system of levers receiving the load directly from the pressure-column and with a rotary indicator, showing the load, substantially as set forth.

14. The combination of one or more resisting-levers, a flexible diaphragm, and a pressure-column, whereby the pressure or load is communicated directly to said lever or levers, substantially as described.

ALBERT H. EMERY.

Witnesses:
LUDWIG HAILER,
MAHLON RANDOLPH.